Feb. 11, 1964  A. STRATIENKO  3,120,948
VARIABLE ANGLE MIXER DRIVE
Filed March 15, 1962  5 Sheets-Sheet 1

INVENTOR.
Andrew Stratienko,
BY
Paul & Paul
ATTORNEYS.

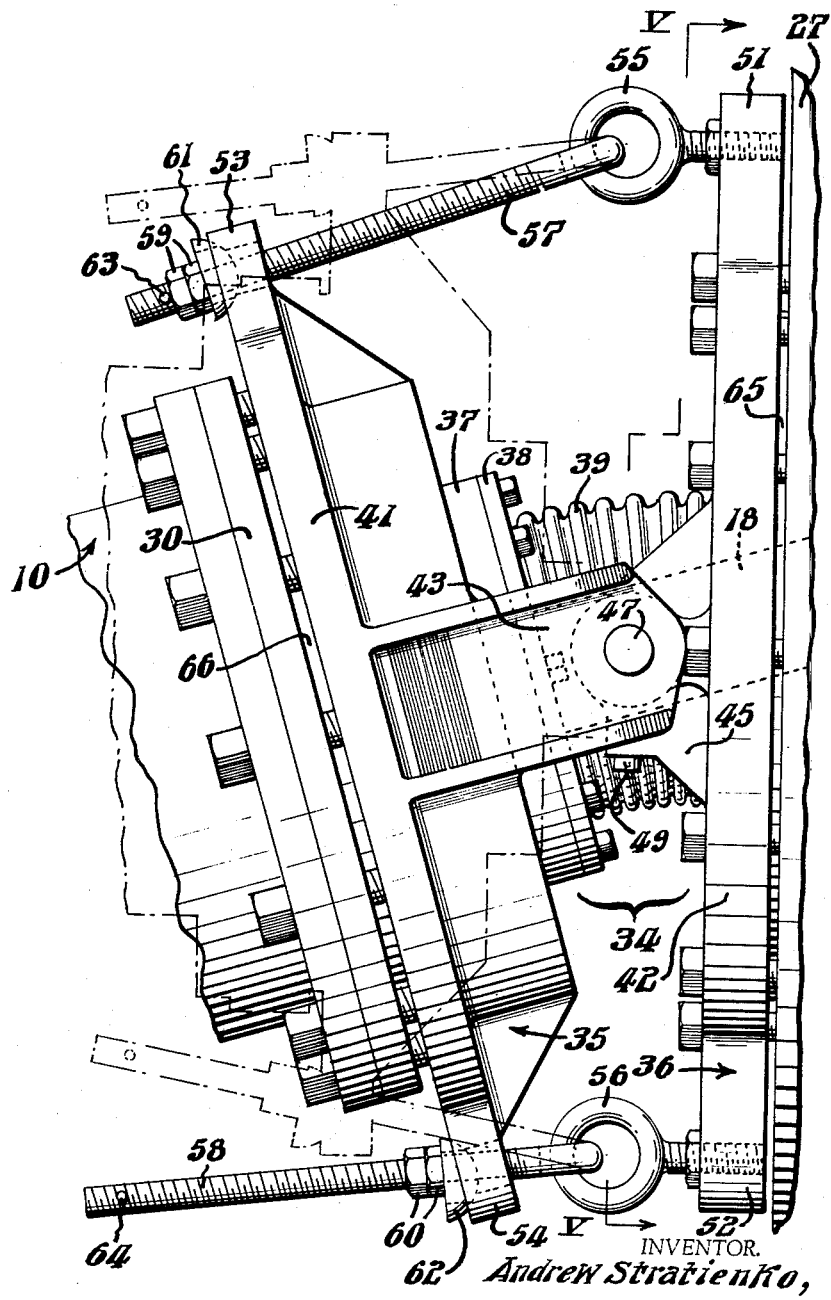

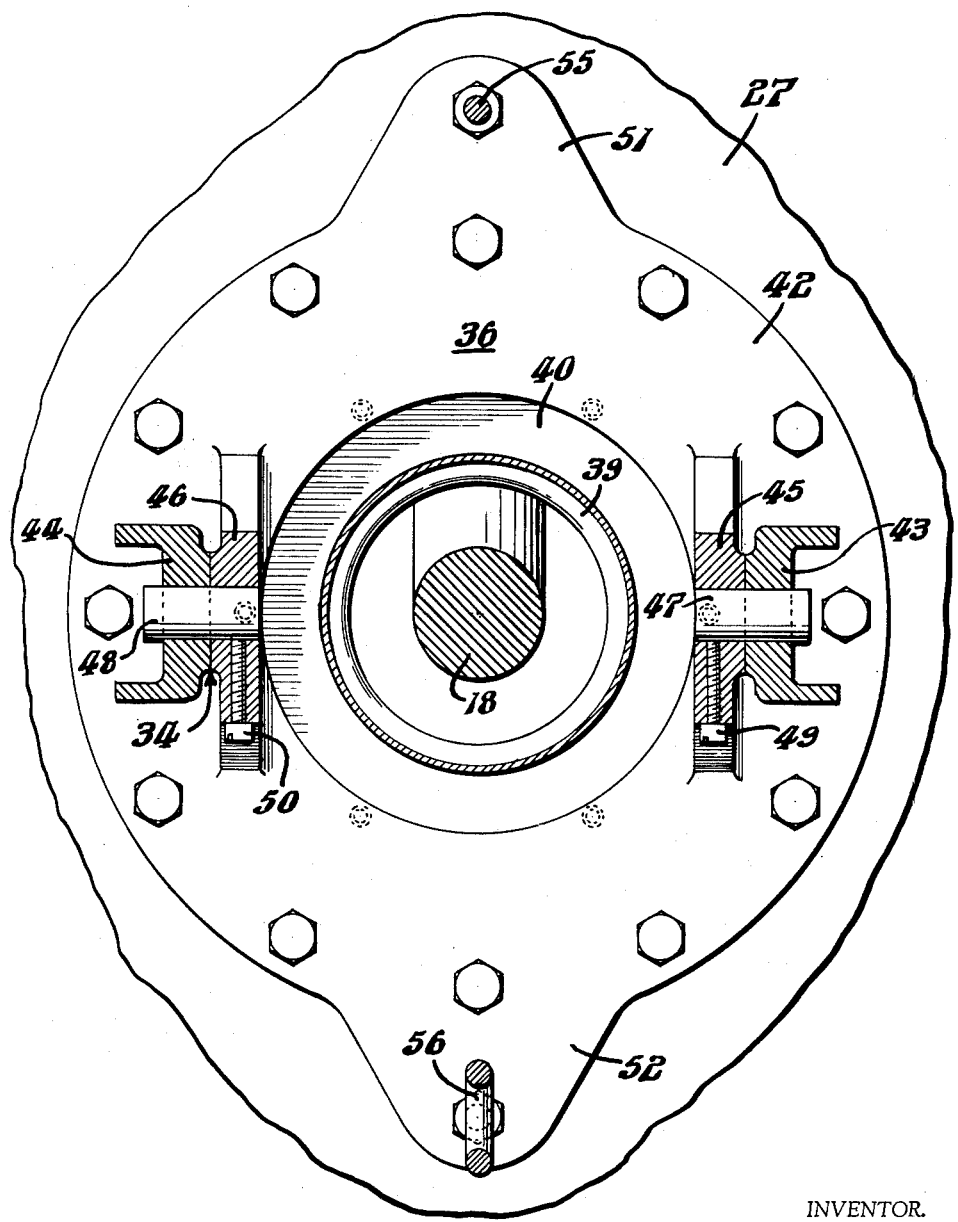

United States Patent Office 3,120,948
Patented Feb. 11, 1964

3,120,948
VARIABLE ANGLE MIXER DRIVE
Andrew Stratienko, Philadelphia, Pa., assignor to King of Prussia Research and Development Corporation, King of Prussia, Pa., a corporation of Pennsylvania
Filed Mar. 15, 1962, Ser. No. 179,982
11 Claims. (Cl. 259—111)

This invention relates to fluid mixers.

The object of the present invention is to provide improved mounting means for so mounting the mixer drive means on the tank as to permit the impeller drive shaft to be adjusted to different angular positions.

In accordance with the present invention, the mixer drive means is pivotally so mounted on the tank that the impeller drive shaft may be readily adjusted to any angular position within an angle of 15–20° on either side of normal. The mixer drive mounting means is so designed that the load is supported independently of the seal joint.

The mixer drive mounting means provided by the present invention includes a jointed two-part mounting assembly for pivotally supporting the mixer drive on the tank, and an expansible tubing or bellows, preferably of stainless steel, supported by the jointed two-part mounting assembly and through which the mixing impeller shaft passes. Fluid from the tank fills the space within the bellows not occupied by the impeller drive shaft. Leakage is prevented by sealing means which are not disturbed or affected when the impeller drive shaft is adjusted to a different angular position.

The invention will be best understood from a consideration of the following detailed description of a preferred embodiment selected for illustration in the drawing, in which:

FIG. 4 is a top view of a portion of the variable-angle mounting means of FIG. 1; and FIG. 5 is an end elevational view, in slightly staggered section, along the line V—V of FIG. 4.

Figure 1:
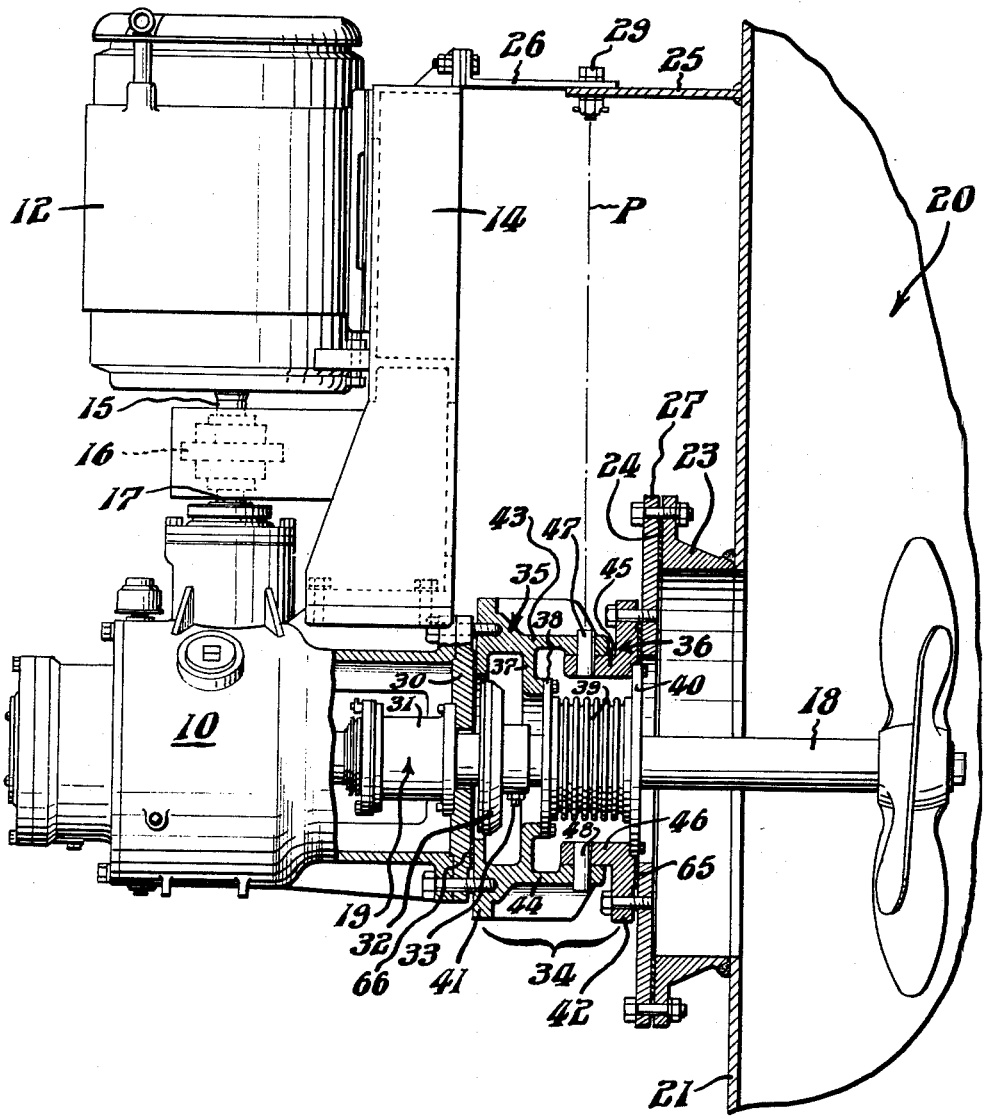
FIG. 1 is a side elevational view, partly in section, illustrating my improved variable-angle mounting means for a side-entering mixer.

In describing the preferred embodiments of the invention illustrated in the drawing, specific terminology has been resorted to for the sake of clarity. However, it is not my intention to be limited to the specific terms so selected, and it is to be understood that each specific term includes all technical equivalents which operate in a similar manner to accomplish a similar purpose.

Referring first to FIG. 1, I have illustrated a mixer drive housing 10 and a motor 12 mounted on a support stand 14. Motor 12 is shown mounted vertically, with its output shaft 15 coupled through a coupling 16 to the vertically-disposed input shaft 17 of the mixer drive. Within the mixer drive housing 10, but not shown in the drawing, are gear reducer means, bevel gears, and the necessary bearings and supports by means of which the mixer drive input shaft 17 drives the horizontally-disposed mixer impeller shaft 18. Surrounding impeller shaft 18, within the drive housing 10, are sealing means 19 which may be either an end-face mechanical seal or a stuffing-box seal.

The means thus far described, comprising essentially the mixer drive 10, the motor 12, and the support stand 14, may be considered as the drive assembly unit.

The means by which the drive assembly unit is pivotally mounted on the wall 21 of a mixer tank 20 to permit adjustment of the angular position of the impeller shaft 18, will now be described.

Secured, as by welding, to the side of the tank wall 21 and surrounding a hole in the wall through which the mixing impeller shaft 18 passes into the interior of the tank 20, is an annular flange 23. Bolted to annular flange 23 is an adapter ring 27. An annular gasket 24 is provided between ring 27 and flange 23 for preventing fluid leakage.

Disposed between the inward end of housing 10 of the mixer drive and adapter ring 27 is a two-part jointed mounting assembly 34 comprising an outward part 35 and an inward part 36. Part 35 has an annular base portion 41 bolted to the inward end of the mixer drive housing 10, while part 36 has an annular base portion 42 bolted to the adapter ring 27.

Part 35 is provided with an internal annular flange 37 to which is bolted the flange 38 of a bellows 39. Bellows 39 is preferably of stainless steel. Welded to the other end of bellows 39 is a flange 40 which is bolted to the annular base portion 42 of part 36.

Projecting integrally forward from the annular base portion 41 of part 35 are a pair of pivot arms, an upper arm 43, and a lower arm 44. These arms occupy diametric positions.

Projecting integrally forward from the annular base portion 42 of part 36, toward the part 35, are a pair of pivot arms, an upper arm 45 and a lower arm 46.

Figure 2:
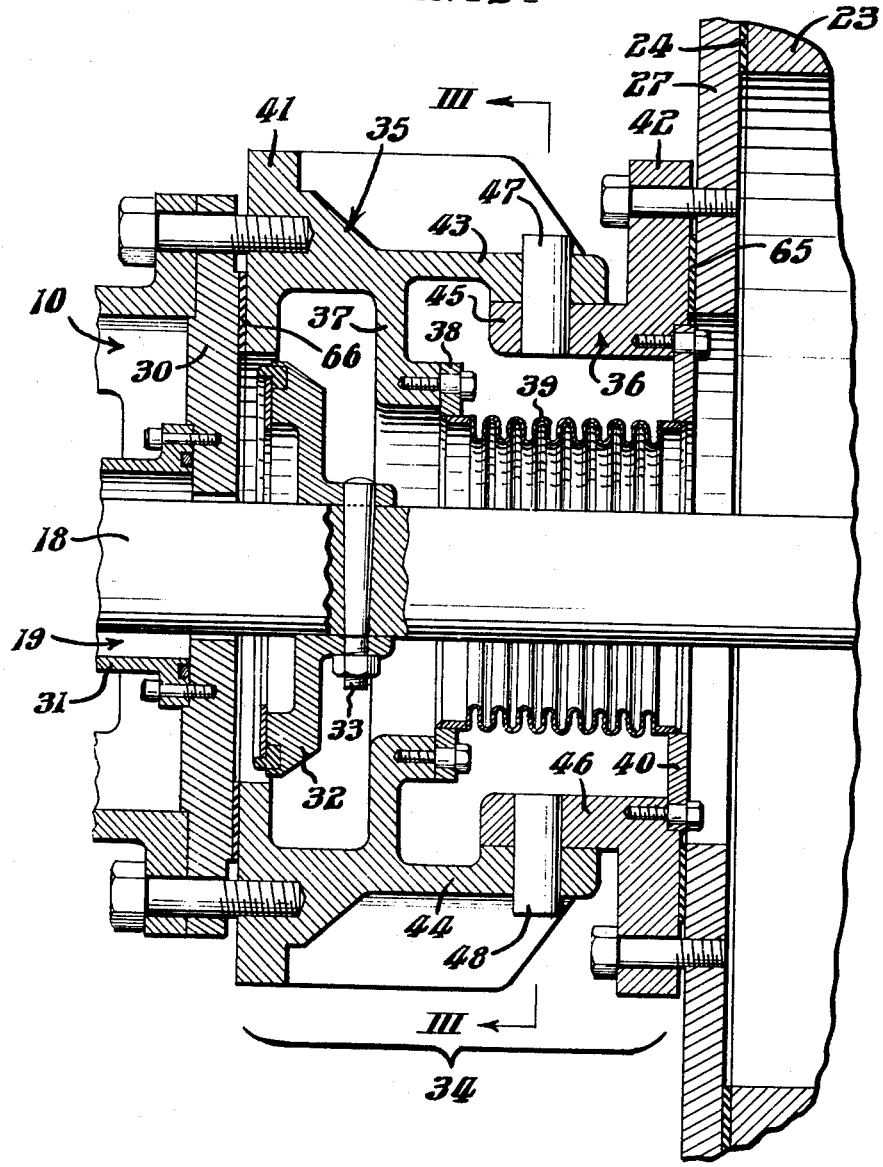
FIG. 2 is an enlarged side elevational view, in section, of a portion of FIG. 1.
Figure 3:
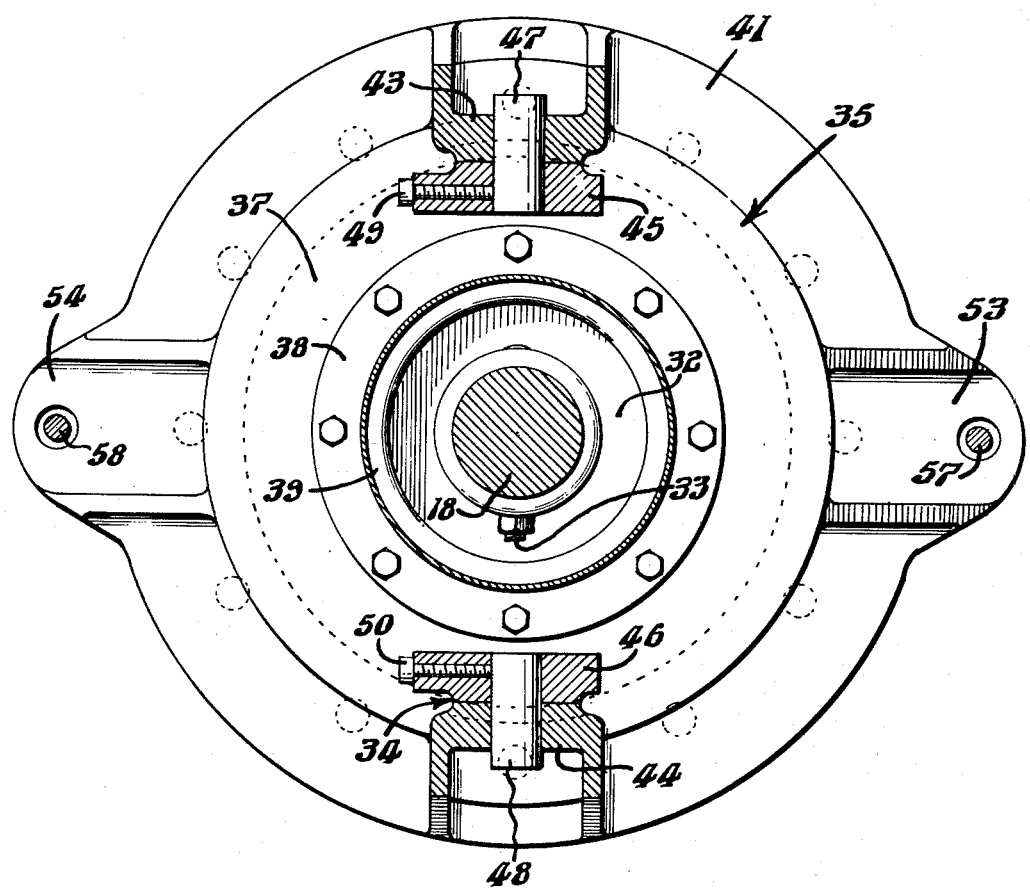
FIG. 3 is an end elevational view along the line III—III of FIG. 2.

As seen in FIGS. 1 and 2, the projecting pivot arms 43, 44 of base portion 41 are located at a different radial distance from the center line of the annuli than are the pivot arms 45, 46 of base portion 42, and the pivot arms of one part underlie those of the other. Each of the pivot arms 43–46 is provided with a radial hole therethrough, and a pair of pivot pins 47, 48 are placed into the aligned holes and held in place by a set screw 49, 50, as seen in FIGS. 3 and 5.

As seen in FIG. 5, the annular base portion 42 of part 36 is provided with ears 51, 52 which extend horizontally outward on opposite sides of the center hole for the impeller shaft. Similarly, as seen in FIG. 3, the annular base portion 41 of part 35 is provided with ears 53, 54 which extend horizontally outward on opposite sides of the center hole.

Ears 51, 52 are provided with threaded holes into which eyebolts 55, 56 are inserted, while ears 53, 54 are provided with countersunk holes through which the tie rods 57, 58 are passed. The spacing between the eyebolt holes in ears 51, 52 is somewhat greater than the spacing between the tie-rod holes in ears 53, 54. Thus, when the two-part mounting assembly 34 is in coaxial alignment with the mixer drive housing 10, as illustrated in FIGS. 1 and 2, the tie rods 57, 58 converge in the manner illustrated by the dot-and-dash representations in FIG. 4. When the two-part mounting assembly 34 is pivoted about pivot pins 47, 48 so that the mixer drive housing 10 and mounting part 35 are in alignment on a line which represents an angular departure from the extended center line of part 36, then the tie rods 57, 58 occupy positions, as for example, the positions illustrated by the solid line representations in FIG. 4.

Change from the straight position, illustrated in dot-and-dash lines in FIG. 4, to an angular position, such as is illustrated in solid lines in FIG. 4, may be accomplished by loosening both sets of tie rod nuts 59, 60, turning the drive assembly to its new desired angular position, and then tighening the sets of tie-rod nuts 59, 60. Or, the change may be effected by alternately loosening the set of nuts on one tie-rod and tightening the set of nuts on the other. Steel spherical washers 61, 62 are provided for tight engagement with the entire surface area of the countersunk portion of the tie-rod holes. Each of the tie rods 57, 58 may preferably be provided with a limit pin 63, 64 for limiting the extent of the angular departure of the impeller drive shaft 18 from its normal position, normal to the wall 21 of the tank 20.

As seen in FIG. 1, the mixer drive assembly is supported at its upper end by a bracket 26 pivotally secured, as by pivot pin 29, to a support arm 25 welded to wall 21 of the tank 20. Pivot pin 29 is in vertical alignment with pivot pins 47, 48 of the two-part mounting assembly 34, on a vertical line P about which the mixer drive assembly is pivoted.

Fluid leakage is prevented by gasket 24, previously referred to, and by annular gaskets 65 and 66. Gasket 65 is provided between adapter 27 and the annular base portion 42 of part 36. Gasket 66 is provided between the annular base portion 41 of part 35 and an annular plate 30 located between the part 35 and the end of the mixer drive housing 10. Plate 30 serves as a support for the housing 31 of the sealing means 19, which, as previously indicated, may be an end-face mechancial seal or a stuffing-box seal.

Plate 30 also serves, in combination with an auxiliary seal 32, as a means for sealing the mechanism against leakage when the primary sealing means 19 is removed for replacement or repair. Auxiliary seal 32 is secured to the impeller shaft 18, as by a bolt 33, in such position as to be normally out of engagement with plate 30. Thus, in normal operation, auxiliary sealing means 32 rotates with the impeller shaft 18. When the primary sealing means 19 is to be repaired or replaced, the impeller shaft 18 is moved axially outward (to the left in FIGS. 1 and 2) and the auxiliary sealing means 32 is brought into sealing engagement with the plate 30.

It will be seen that, during normal operation, the fluid in tank 20 is free to flow through bellows 39, over and past auxiliary seal 32, through the annular spacing between shaft 18 and the wall of the opening in plate 30, and into the housing 31 of the end-face mechanical seal 19. Here, the sealing means prevents the escape of fluid. During repair or replacement of the primary sealing means 19, the impeller shaft is moved outward, as previously explained, until the auxilary seal 32 comes into tight sealing engagement with plate 30.

I have illustrated my improved mounting means as applied to a side-entering mixer. By the mechanism shown and described, the impeller drive shaft 18 may occupy a position normal to the wall 21 of the tank 20, or may be adjusted horizontally to any angular position within an angle of the order of 15-20° of normal, a total angular movement of the order of 30-40°.

While I have shown and described my improved pivotal mounting means as applied to a side-entering mixer, the mechanism is also applicable to a top-entering mixer.

Prior art adjustable mounting mechanisms for the same or similar purposes employ a ball joint and a hermetic seal for the moveable ball joint. In such construction, the load is supported on the seal joint.

In the mechanism of the present invention, as contrasted with that of the prior art of which I am aware, there is no seal required for a movable joint, and the load is supported entirely independently of the seal joint. The mechanism is compact, dependable, of relatively small size, and of relatively low cost. There is no wear on the bellows when the angular position is changed, and the life of the mechanism is expected to be long.

I have described a preferred embodiment of my invention in some detail. Various modifications may be made thereto without departing from the scope of my invention as defined by the appended claims.

Having described my invention, I claim:

1. In a fluid mixer; a mixing tank; a mixing impeller shaft extending into said tank through a wall thereof; drive means for said impeller shaft external of said tank; a housing for said drive means; mounting means adjustably supporting said drive means and housing on the wall of said tank, said mounting means including a two-part jointed mounting assembly having one part fixed to the wall of said tank and a second part adapted for angular pivotal movement in a plane which is substantially at right angles to the plane of said wall of said tank, said mounting assembly being connected between said housing of said drive means and said wall of said tank; and a flexible tubing through which said shaft passes, said tubing having one end mounted on one part of said two-part jointed mounting means and the other end mounted on the other part of said two-part jointed mounting means.

2. Apparatus as claimed in claim 1, characterized in that each part of said two-part jointed mounting assembly comprising an annular base having a pair of diametrically disposed arms extending forwardly therefrom in the direction of and overlapping the extended arms of the other part, means pivotally securing each of said arms of said one part to the corresponding arm of said other part, the annular base of said one part being secured coaxially to said drive means housing, the annular base of said other part being secured to said tank wall.

3. Apparatus as claimed in claim 2, further characterized in that said annular base of said one part of said two-part jointed mounting is provided with an internal annular flange, and in that said tubing is mounted between said internal annular flange and the annular base of said other part.

4. Apparatus as claimed in claim 3, further characterized in that a motor is provided for said drive means mounted at right angles to said impeller shaft and parallel to said tank wall, and in that additional pivotal support means are provided for supporting said motor from said tank wall, the pivot point of said last-named pivotal support means being in alignment with the pivot points of said arms of said two-part jointed mounting assembly.

5. In a fluid side-entering mixer; a mixing tank; a mixing impeller shaft extending laterally into said tank through a hole in a side wall thereof; drive means for said impeller shaft external of said tank; a housing for said drive means; mounting means adjustably supporting said drive means and housing on the side wall of said tank, said mounting means including an annular flange secured to said side wall surrounding said hole and a two-part jointed mounting assembly having one part secured to said annular flange and the other part connected to said drive means housing and adapted for angular pivotal movement in a horizontal plane substantially normal to said side wall of said tank; a flexible tubing through which said shaft passes, said tubing having one end mounted on one part of said two-part jointed mounting means and the other end mounted on the other part of said two-part jointed mounting means.

6. Apparatus as claimed in claim 5, characterized in that each part of said two-part jointed mounting assembly comprising an annular base having a pair of diametrically disposed arms extending forwardly therefrom in the direction of and overlapping the extended arms of the other part, means pivotally securing each of said arms of said one part to the corresponding arm of said other part, means securing the annular base of said one part coaxially to said drive means housing, and means securing the annular base of said other part to said annular flange.

7. Apparatus as claimed in claim 6, further characterized in that said annular base of said one part is provided with an internal annular flange, and in that said tubing is mounted between said internal annular flange and the annular base of said other part.

8. Apparatus as claimed in claim 7, further characterized in that a motor is provided for said drive means mounted at right angles to said impeller shaft and parallel to said tank wall, and in that additional pivotal support means are provided for supporting said motor from said tank wall, the pivot point of said last-named pivotal support means being in alignment with the pivot points of said arms of said two-part jointed mounting assembly.

9. Apparatus as claimed in claim 8, further characterized by the provision of an auxiliary annular sealing plate mounted on said shaft within said two-part jointed mounting assembly but spaced from said drive means housing and normally out of sealing engagement therewith but adapted to be brought into sealing engagement therewith by axial movement of said impeller shaft in connection with repair or replacement of said first-named sealing means.

10. Mounting means for adjustably supporting a mixer drive housing and a mixer drive for a mixing impeller shaft on the wall of a mixing tank, said mounting means including a two-part jointed assembly, one part of which is adapted for angular pivotal movement in a plane substantially at right angles to the plane of the wall of said tank, said one part of said jointed assembly being connected to the mixer drive housing and the other part being connected to the wall of said tank, and a flexible tubing through which the mixing impeller shaft is passed, said tubing having one end mounted on one part of said jointed assembly and the other end mounted on the other part of said jointed assembly.

11. Apparatus as claimed in claim 10 characterized in that each part of said two-part jointed assembly comprises an annular base having a pair of diametrically disposed arms extending forwardly therefrom in the direction of and overlapping the extended arms of the other part, and means for pivotally securing each of said arms of said one part to the corresponding arm of the other part.

References Cited in the file of this patent
UNITED STATES PATENTS

| | | |
|---|---|---|
| 2,627,171 | Brumagim | Feb. 3, 1953 |
| 2,976,703 | Atkinson | Mar. 28, 1961 |
| 2,987,264 | Campbell | Apr. 4, 1961 |